March 10, 1959
P. L. KNIGHT
2,876,831
INTERNAL-COMBUSTION BURNERS
Filed March 8, 1951
2 Sheets-Sheet 1
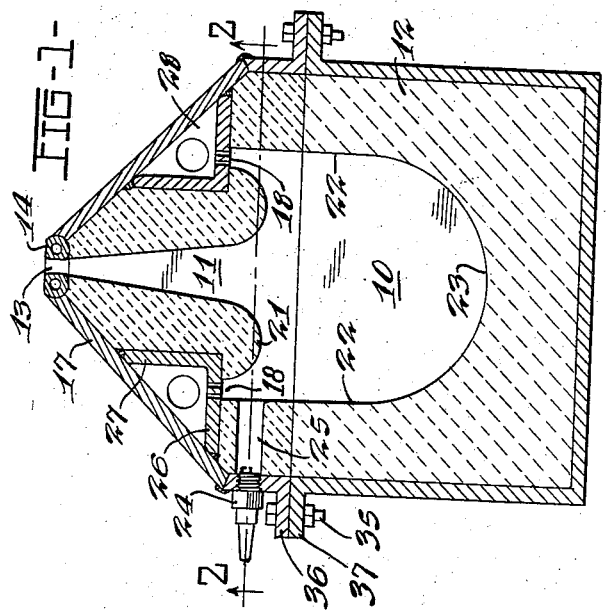
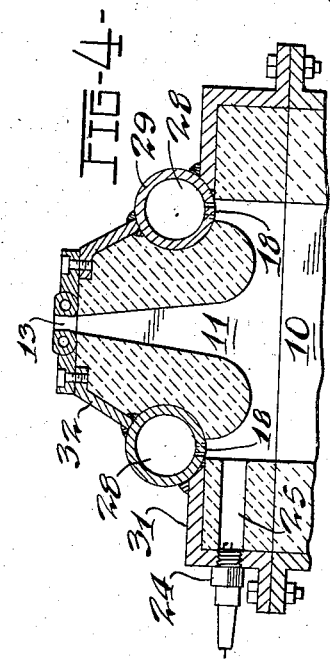
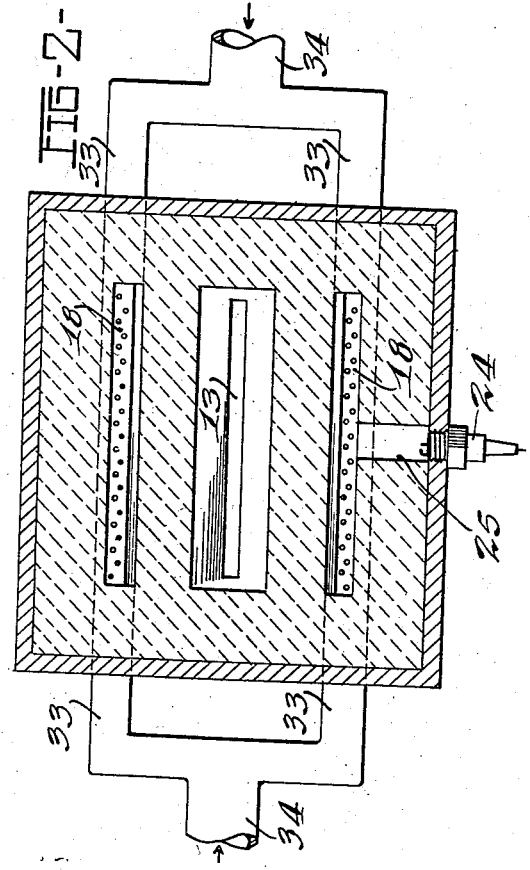
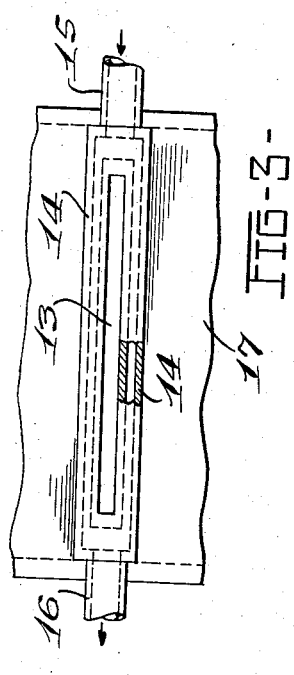
INVENTOR:
P. L. KNIGHT
BY
Charles A. Lind
ATTORNEY

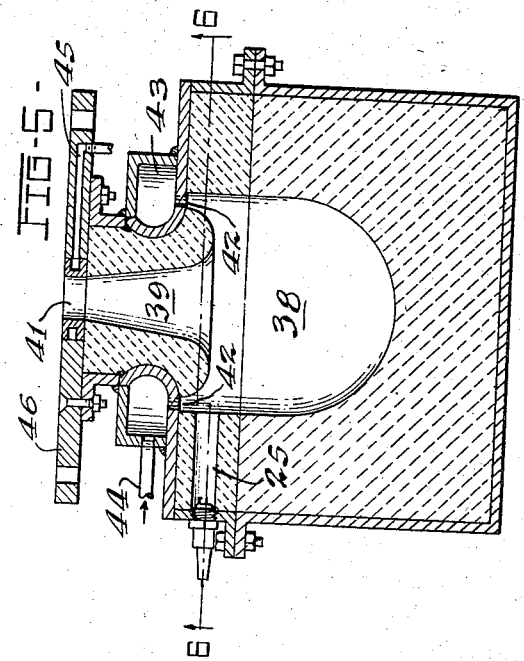
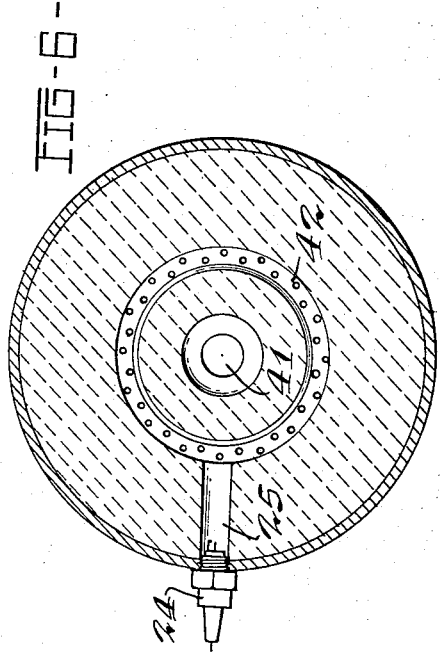
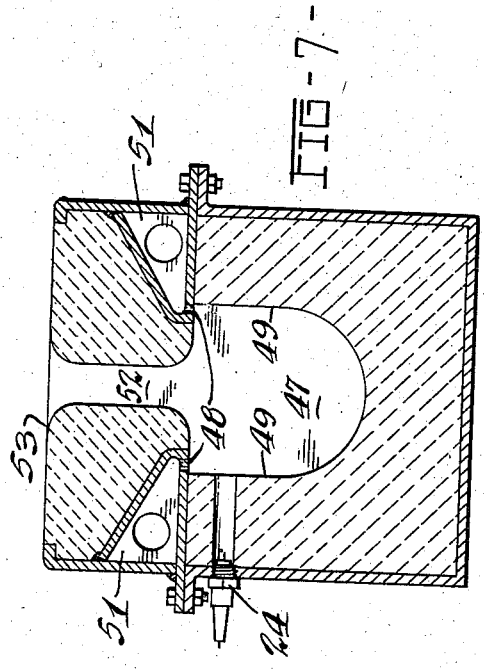

United States Patent Office 2,876,831
Patented Mar. 10, 1959

2,876,831

INTERNAL-COMBUSTION BURNERS

Philip L. Knight, Toledo, Ohio, assignor to Surface Combustion Corporation, Toledo, Ohio, a corporation of Ohio Application March 8, 1951, Serial No. 214,499

3 Claims. (Cl. 158—99)

Certain industrial operations require the use of a high velocity stream of highly heated gases and it is the object of the present invention to provide an internal-combustion burner which shall be well adapted for producing a high velocity stream of highly heated products of combustion for such operations.

For a consideration of what I consider to be novel and my invention, attention is directed to the following specification and the concluding claims thereof.

In the drawings forming part of this specification,

Fig. 1 is a sectional view of a burner embodying the present invention.

Fig. 2 is a view on line 2—2 of Fig. 1.

Fig. 3 is a fragmentary top plan view of Fig. 1.

Fig. 4 is a fragmentary sectional view similar to Fig. 1 bu illustrating how a detail of construction in Fig. 1 may be modified.

Fig. 5 is a sectional view of a slightly modified form of burner embodying the present invention.

Fig. 6 is a view on line 6—6 of Fig. 5.

Fig. 7 is a sectional view of another form of burner embodying the present invention.

In the embodiment of the invention disclosed in Fig. 1, the burner comprises a closed combustion chamber 10 and a tapered passage or outlet 11 wherethrough the hot products of combustion produced in said chamber must flow to find exit from said chamber. The temperature attained in said combustion chamber is so high that the walls of said chamber and of said outlet are made of insulating and refractory material 12. The discharge nozzle 13 of said outlet is a relatively narrow slot so that the hot products of combustion may expand therethrough and discharge as a flat stream with high velocity. In cases where the operation to be performed requires a better nozzle than can be produced by wholly ceramic walls, the nozzle may be formed with suitably shaped metal members 14 at the terminus of the nozzle which will ordinarily be tubular to permit a coolant to be passed therethrough. As shown in Fig. 3, said members 14 are joined at one end for connection with a coolant supply pipe 15 and at their other ends are joined for connection with a drain pipe 16. Said members 14 may be held in position by being welded to metal side walls 17 which constitute part of the exterior casing of the burner.

The fuel to be burned in the combustion chamber 10 is introduced as a fully aerated, combustible mixture of air and fuel so the mixture may burn with great rapidity. The mixture is introduced into the combustion chamber through two longitudinally extending admission ports 18 one at either side of the mouth of said discharge passage 11 between a rounded lip 21 thereof and the adjacent side wall 22 of the combustion chamber, the mixture being introduced with such high velocity that each of the burning streams tends to maintain its integrity until it reaches the bottom or back wall 23 of the combustion chamber so that the flames may impinge against said back wall. Since the streams from opposite sides of said chamber collide along the bottom wall of said chamber and must make a reverse bend to flow towards the mouth of said passage 11 the turbulent flow thus produced results in exceedingly rapid combustion of the residual fuel with resultant high temperature of the products of combustion, and with substantially no loss of heat from the gases. The air-fuel mixture is initially ignited by sparks from a spark plug 24 whose electrodes are at one end of a recess 25 in the side wall of the combustion chamber at a point near one of admission ports 18, the recess serving to shield the electrodes from radiant heat in the combustion chamber. It is preferred to make the back or bottom wall 23 of the combustion chamber rounded rather than flat so as to guide the flames towards each other along said bottom and to lessen the tendency for hot spots to develop in the refractory. Each stream of said mixture initially flows along the surface of the adjacent side wall 22 of the combustion chamber whereby the scrubbing effect of said surface is an important factor in accelerating combustion.

Where temperatures and velocities of the discharging gases require an energy content greater than attainable with ordinary air-fuel mixtures, preheating or oxygen enrichment of the mixture may be employed.

It is apparent from the above description that the invention provides a burner wherein the burning gases tend to traverse the combustion chamber twice, first in contact with the side walls 22 thereof and then, after collision along the bottom wall 23 with great turbulence, again traversing the chamber to the discharge passage 11. As a result of this method combined with the pressures which may be established within the combustion chamber, and the conservation of heat of reaction in that chamber by adequate use of refractory, combustion at extremely high burning rates may be obtained. It may be further emphasized that this permits the production of large volumes of high temperature and high velocity gases in and from a relatively small combustion chamber, it being understood that a portion of the thermal energy generated under pressure in the combustion chamber is converted to velocity energy as the gases expand through the nozzle.

Each of the two longitudinally extending admission ports 18 will ordinarily consist of a plurality of rows of drilled holes in a metal wall 26. In Fig. 1 said wall 26 is shown as one of the legs of an angle iron 27 whose longitudinal edges are welded to the inner side of the burner casing plates 17 to form an air-fuel manifold 28. However, as shown in Fig. 4, each manifold 28 may be defined by a longitudinally extending tube 29 welded to and inserted between split portions 31 and 32 of the burner casing.

The preformed mixture of air and fuel is simultaneously delivered to both of said manifolds 28 (and preferably to both ends of each) by branch pipes 33 leading from a main supply pipe 34 leading from a source of supply of said mixture. In order to simplify manufacturing operations (such as casting of the refractory material 12) the burner may be divided into suitable sections (shown as upper and lower halves) secured together by bolts 35 extending through complementary peripheral flanges 36 and 37 on the exterior metal casing of the burner.

In the modified form of burner disclosed in Fig. 5, the combustion chamber takes the form of a cylindrical pot 38 instead of a rectangular trough 10 as in Fig. 1 and the discharge passage 39 and discharge nozzle 41 are round rather than rectangular. Since the combustion chamber is a cylindrical pot the air-fuel mixture is introduced into the latter through a ring-type port 42 coaxial with said pot. Since the admission port 42 is annular the supply manifold 43 is likewise annular. The air-fuel mixture is supplied to said manifold under pressure by one or more circumferentially spaced supply pipes 44. Coolant for the discharge nozzle 41 may be supplied and removed from the coolant passage about the nozzle through radial passages 45 in a burner mounting plate 46.

It will be evident without further comment that the manner of burning the air-fuel mixture is substantially the same as that described in connection with the burner disclosed in Fig. 1.

In the modified form of burner disclosed in Fig. 7 the combustion chamber 47 may be consideerd as being rectangular the same as in Fig. 1 and the air-fuel mixture is introduced into said chamber through a pair of longitudinally extending ports 48, one along each side wall 49 of the said chamber, each port having its own supply manifold 51 to which said mixture is supplied under pressure in the same manner as in the burner in Fig. 1. The burner of Fig. 7 is designed for considerably lower discharge velocities than the burner in Fig. 1 and therefore the discharge passage 52 for the products of combustion produced in said chamber may be relatively unrestricted. Also in Fig. 7 the discharge face 53 of the burner has been shown as flat to accommodate it to certain operations.

It is believed to be evident without further comment that the manner of burning the air-fuel mixture is substantially the same as that described in connection with the burner disclosed in Fig. 1.

In order to minimize disruption of the integrity of the streams of said combustible mixture as they flow from the admission ports towards the back wall of the combustion chamber (and to some degree for constructional reasons), the combustion chamber is symmetrical about the mouth of the outlet through which the products of combustion find exit from the combustion chamber and for the same reasons said mouth is symmetrical with or midway between said admission ports. However, it is within the spirit of the invention to arrange said ports more or less asymmetrical to the extent that there is no serious disruption of the integrity of said streams as they flow as aforesaid.

What I claim as new is:

1. An internal combustion burner for producing a high velocity stream of highly heated products of combustion, comprising: wall means having an opaque lining of insulating and refractory material and forming a closed, pressure tight combustion chamber for burning fuel under pressure and coverting the heat of reaction thereof to thermal energy without substantial loss of thermal energy therefrom, said wall means forming a discharge nozzle serving as an outlet through which products of combustion expand and convert a portion of said thermal energy to velocity energy, the nozzle being formed in the center of the front wall of the chamber, and a series of fuel inlet ports symmetrically formed on opposite sides of the nozzle and at the edges of the front wall and aligned to discharge fuel initially parallel and adjacent to the side wall of the chamber, and the side and back walls of the chambers forming with the front wall a cup shaped, closed combustion chamber with a continuously curved refractory surface from next adjacent the inlets to the center of the back wall, whereat burning streams of fuel converge before passing through the combustion chamber to and through the nozzle.

2. An internal combustiton burner for converting a mixture of fuel and air into a high velocity stream of highly heated products of combustion for heating work comprising: a refractory rear wall having a substantially semi-circular cross-section; a refractory side wall tangentially connected to said rear wall; wall means including a front wall connected to said side wall for forming a pressure tight combustion chamber with said side and rear walls; a high velocity discharge nozzle located in said front wall, centrally located with respect thereto, and whose axis substantially symmetirically intersects said rear wall; a plurality of fuel ports in at least one of said walls, symmetrically disposed with respect to said nozzle, and whose axes are parallel, said ports being arranged to discharge tangentially toward said rear wall; ignition means in said chamber for igniting mixture therein; manifold means located outside said combustion chamber for delivering a mixture of fuel and air through said ports whereby said mixture is emitted tangentially to said rear wall to meet and turbulently mix at the center thereof and subsequently pass out said nozzle at high velocity to heat work adjacent thereto.

3. Apparatus according to claim 2 characterized by the ports being located in the front wall.

References Cited in the file of this patent
UNITED STATES PATENTS

| Number | Name | Date |
|---|---|---|
| 871,070 | Schwartz | Nov. 12, 1907 |
| 1,689,551 | Hammond | Oct. 30, 1928 |
| 2,105,344 | Campbell | Jan. 11, 1938 |
| 2,215,079 | Hess | Sept. 17, 1940 |
| 2,282,551 | Yates | May 12, 1942 |
| 2,569,699 | Stalego | Oct. 2, 1951 |
| 2,606,421 | Goddard | Aug. 12, 1952 |
| 2,614,619 | Fuller | Oct. 21, 1952 |
| 2,660,235 | Patterson | Nov. 24, 1953 |